Sept. 7, 1943.　　　V. R. DESPARD　　　2,329,109
OUTLET BOX
Filed March 3, 1941
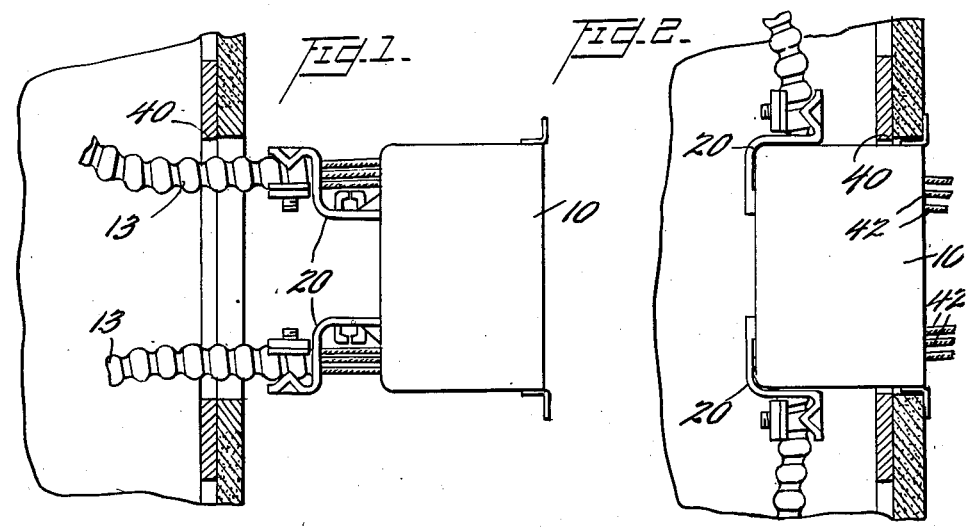
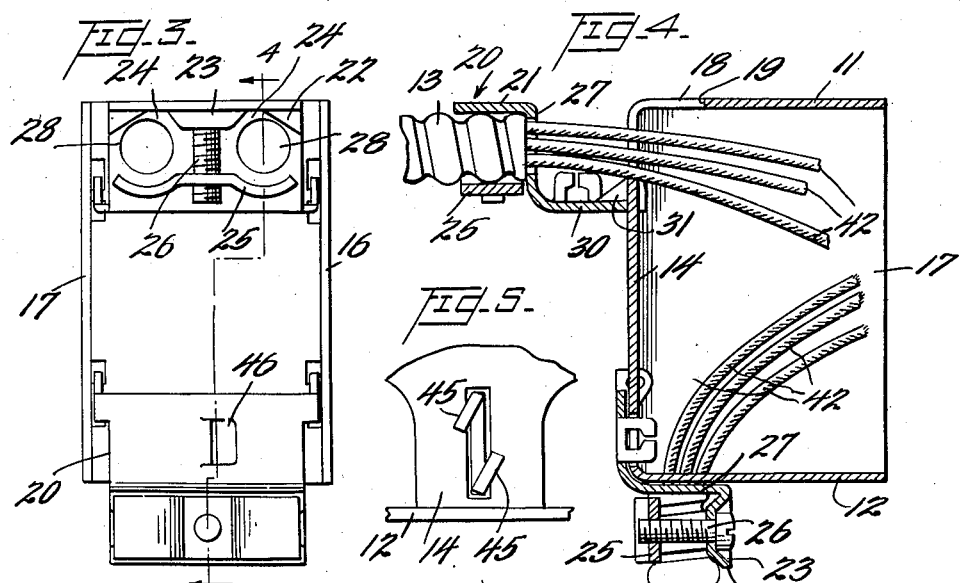
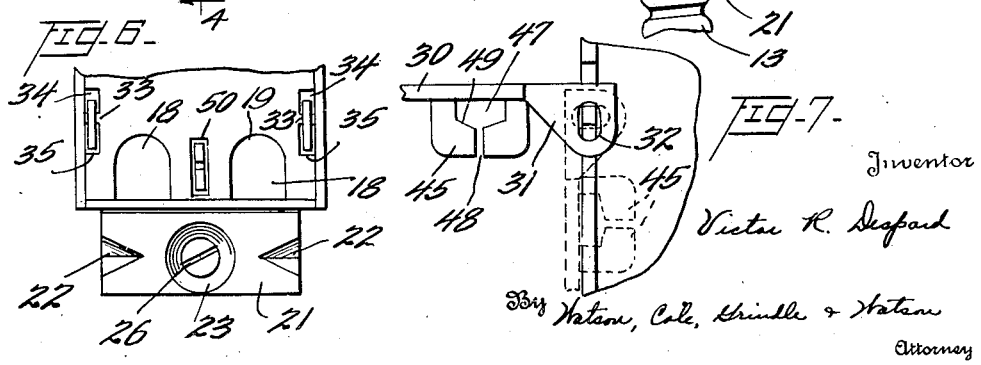

Patented Sept. 7, 1943

2,329,109

UNITED STATES PATENT OFFICE 2,329,109

OUTLET BOX

Victor R. Despard, Syracuse, N. Y., assignor to Pass & Seymour, Inc., Syracuse, N. Y., a corporation of New York Application March 3, 1941, Serial No. 381,573

15 Claims. (Cl. 220—3.2)

This invention relates to outlet or switch boxes for electric wiring and particularly to the arrangement and cooperation of conductor or cable clamps therewith.

The device of the present invention is primarily intended for the improvement of outlet boxes and cable clamps where such equipment is to be used on so-called "old work," that is, the application of electric wiring and associated parts to completed buildings where outlet and switch boxes must be introduced through openings in the existing plaster or other wall surfaces in such a manner that patching or refinishing of these surfaces is not essential.

Previous to a recent change in the National Electric Code, wall and outlet boxes which are rigid metal or insulating structure could be equipped with internal clamps for securing the cables thereto in the manner required for the purpose of relieving the possibility of strain on the splices or terminal connections and, where metallic armored cable is used, to provide continuity of ground connection through the box from one cable to another where several are attached thereto. The new code seriously restricts the number of conductors which may be introduced into a box because of the presence of interior cable clamps which consume considerable space within the box and would result in too much crowding of wires and wiring devices.

The recent tendency toward the use of a plurality of wiring devices in small boxes such, for instance, as the single gang size which was originally reserved for one wiring device and now may accommodate three, requires the entrance of a plurality of cables and conductors into the box. In order that this number may not be reduced beyond that required for the purpose of the wiring devices secured to the box, outside cable clamps are in many cases necessary. For new work where the boxes are secured in position and subsequently wired before the laths and plaster or other wall surface is applied, outside cable clamps are an adequate solution to the problem, but for "old work" where the box must be introduced through an opening, cut in the plaster or other wall surface, which is not substantially larger than the box, in order that the opening may be covered by the finish or wall plate, outside cable clamps of the type at present known cannot be used since they project beyond the ends or sides of the box to such a distance that the opening required for their introduction could not be covered by the standard wall plate.

In accordance with the present invention, outside cable clamps are provided which are so associated with the wall box that the same may be introduced through the normal sized opening in the wall so that "old work" can be performed with substantially the same facility as new.

It is therefore a general object of the present invention to provide a novel and improved combination of wall box and outside cable or conductor clamps.

More particularly it is an object of the invention to provide a wall or switch box together with one or more outside cable clamps so articulated to the same that they may be positioned within the projected frontal area of the box for introduction of the same with the cables attached thereto through a restricted opening in the wall and thereafter may have the cables and their clamps swung to a position so that the cables extend substantially normally from the ends of the box in the conventional manner.

Another object of the invention consists in the provision of a box having corner knock-outs permitting rotary movement of conductors through the same under the action of articulated cable clamps.

An important feature of the invention consists in the arrangement and mounting of the cable clamps for hinging to the box without the addition of extra parts or complicated structures, together with means for locking the clamps in their final position on the box, which means are available from within the box.

Still another feature of the invention comprises the use of knock-outs extending around the edge of a box into two walls thereof, together with a cable clamp having a part which may be positioned to close these knock-outs and whose over-all dimension is greater than that of the cable introduced for full compliance with the National Electric Code.

Other and further features and objects of the invention will be more apparent to those skilled in the art upon a consideration of the accompanying drawing and following specification wherein is disclosed a single exemplary embodiment of the invention with the understanding that such changes and modifications may be made therein as fall within the scope of the appended claims without departing from the spirit of the invention.

In said drawing:

Figure 1 is a side elevation of a switch or outlet box constructed according to the present invention and shown in position outside of a finished wall prior to introducing the box into position in the wall opening and with the cables passing through the opening in the wall and attached to the box by cable clamps of the present invention:

Figure 2 is a view similar to Figure 1 showing the box positioned in the wall opening with the cable clamps rotated to their final position;

Figure 3 is a rear elevation on a scale larger than Figure 1 of a box showing one cable clamp in the open or rearward position and the other in the closed or end wall position;

Figure 4 is a vertical section, on broken line 4—4 of Figure 3, showing cables secured in the two clamps still arranged in the positions of Figure 3;

Figure 5 is a fragmentary view on a still larger scale looking into the interior of the box and showing the clamp locking means in locking position for holding the cable clamp on the box so as to close the knock-out openings and position the cables in their desired position;

Figure 6 is a front view of a fragment of a box showing the cable clamp in its final position; and Figure 7 is a fragmentary view on an enlarged scale of the hinging and locking mechanism of a cable clamp shown in full lines in the open or installing position and in dotted lines in the closed and locked position.

A wall or switch-box is used wherever it is desired to provide some form of wiring device such as an outlet, switch or the like and provides a rigid fireproof structure where the conductors of cables may be bared of their insulation for splicing or attachment to terminals or the like. The National Electric Code requires that these cables be firmly clamped to the box and if they are of the metal sheathed type, that all of the sheaths be grounded to the box.

Both the metal sheathed cable and the non-metallic sheathed cable have an outer casing of large diameter which is to be engaged by the clamps. Beyond the clamps the sheath is removed and the separately insulated conductors from the cable enter the box through openings normally closed by so-called knock-outs in the walls. If interior clamps are used, the whole sheath must be introduced into the box to be engaged under the clamp and this accounts for the large space consumption of interior clamps. Heretofore interior clamps have always been used for old work since they have no outside projection beyond the dimensions of the box and permit insertion of the box into the wall opening without undue enlargement of the opening.

Where, because of the number of conductors which must enter the box, outside clamps are required, it is difficult, if not impossible, particularly where cables lead from both ends of the box, to introduce the box into a wall opening of a size which will permit the same to be covered by the conventional wall plate. The present invention, by hinging the cable clamps so that they can be folded back within the projected frontal area of the box, eliminates all objections to the outside clamps while providing all of their benefits. The present invention is therefore primarily intended for boxes used for old work, although there are no reasons why it could not be used for new work with the same facility. Its use in either case permits the use of shallow boxes in thin partitions when back entrance of cables is impossible.

Referring now to the drawing, it will be seen that the box 10 is in most respects conventional, comprising end walls 11 and 12 preferably integral with the bottom or back wall 14 in the manner of a great many switch boxes. The side walls 16 and 17 may be attached by welding or in the more common manner by interlocking lugs and fastening screws, not shown, which permit the boxes to be multipled by the removing of adjacent sides where it is necessary to provide two or three gang boxes in one unit. Instead of providing circular knock-out openings in the end walls of the boxes as is customary, in addition to whatever others may be desired in the back and side walls, corner or right angle knock-out openings are provided as illustrated at 18 in Figure 4. These have arcuate ends 19, best seen in Figure 6, both in the end walls and back walls and the whole opening extends around the corner or edge of the box as clearly seen. Although not shown in the drawing, these are normally closed by the usual partially punched filler which can be removed by hammering, prying, or the like as is well known. The length and width of the knock-out in the end wall is substantially equivalent to the diameter of the sheath of a cable and it has substantially the same dimensions in the back wall. Preferably two knock-outs are provided in each end wall as illustrated in Figure 6 spaced side by side and each symmetrically placed in its half of the wall.

Each pair of the above knock-outs which are intended for use with cables directed outwardly from the ends of the boxes, is provided with a cooperating cable clamp structure 20 which includes a rigid plate 21 of a length somewhat less than the width of the box, having the V depressions 22 in the ends thereof and a central depression 23 perforated for the passage of a flat headed screw, the head of which is received in the depression. As seen in the upper part of Figure 3, these depressions define channels 24 for the sheaths of cables 13 and which are spaced apart the same distance as the knock-outs in the end walls of the box. The sharp inner edges of the V's are arranged to engage between the convolutions of so-called metal-sheathed or BX cable to serve in preventing it from having any endwise movement when the same is clamped into the channel by the overlying and loose clamping plate 25 attached by means of the screw 26 passing through the central opening in the depression 23 and engaging in a threaded aperture in plate 25. This plate is in the form of a double saddle to engage the sheaths of the cables and under the action of the screw, draw them against the rigid clamping plate where either BX is retained as above described, or non-metallic sheathed cable is held by compression. The rigid clamping plate 21 is formed integral with the right angle portion 27 provided with a pair of holes 28 spaced apart the same distance as the openings 18 and each large enough to pass the individual conductors of one cable but small enough so that the surrounding metal forms a stop limiting the inward movement of the cable sheath whether it be BX or non-metallic. Engagement of the edge of the saddle 25 aginst this right angle plate 27 effectively prevents rotation thereof when the screw is adjusted. The clamps are of dual construction, each adapted to hold two cables, but each will hold one with equal facility when necessary.

Each cable clamp assembly is adapted to be hinged to the box as clearly illustrated in Figures 1, 4, and 7. Referring now to Figure 4, for this purpose there is an integral extension 30 of the right angle plate 27, which is perforated for the passage of the conductors, and this plate 30 which is parallel to clamping plate 21 has the hinge tabs 31 formed integral therewith and bent up at right angles extending along the end edges of the same and each being perforated with a more or less circular aperture 32. These two tabs are laterally spaced apart, with openings in alignment, a distance just equal to the distance between the inner faces of the side walls of the box and the apertures are arranged for pivoting each on an integral tongue 33 extending laterally between recesses 34 and 35 in one edge of the rear wall 14 of the box a short distance from the end wall. In order to install the hinged clamps, the tabs are sufficiently splayed for slipping over the tongues 33 before the side walls are applied to the box. The tabs are then bent inwardly and retain the hinged clamp in position, further reinforced by the application of the side walls of the box. Figures 6 and 7 clearly show the arrangement of the hinges.

The hinges permit the cable clamp assemblies to assume either the position shown in Figure 1 or that shown in Figure 2 as well as all intermediate ones. In the first position the cables which may be clamped into them extend directly backwardly from the box and the clamps themselves are confined within the projected frontal area of the box so that the box can readily be inserted in the restricted opening 40 in the plastered wall. This opening is only sufficiently larger than the frontal area of the box to provide suitable clearance for introducing the same. As shown, the cables to the top clamp run upwardly and those to the lower clamp downwardly in the wall, but it will be appreciated that both sets of cables may not always be necessary. As the box is pressed into the hollow wall the engagement of the cables with the opposite face thereof press the same to assume a more nearly vertical position as shown in Figure 2, swinging the clamps around their hinge lugs through substantially 90°, assisted if necessary by pulls on the individual conductors 42 best shown in Figure 4. These conductors, of course, pass through the right angle knock-outs as seen in that figure, which knock-outs are then completely closed by the parts 27 and 30 of the clamps as seen in the lower portion of the figure. Any clamp which is not used for holding cables may be left in the open position since the knock-out apertures are closed by the filler discs originally formed therein.

To lock the cable clamps in their closed position the plate 30 of each one of them has a tab 45 punched out to form an aperture 46 therein, the one edge of the tab remaining integral with the plate, while the plane of the tab extends at right angles and transversely of the width of the plate. This tab has a central portion 47 thereof cut away and the remainder divided by a slit 48. The inclined inner walls 49 have as their closest spacing to the plate 30, an amount about equal to the thickness of the box wall. A suitably sized and positioned slot 50 in the box wall accommodates the tab when the clamp is in the closed position. A screw-driver inserted in the slit 48 and twisted will bend the two parts of the tab as shown in Figure 5 causing them to overlie the inner face of the back wall of the box and lock the clamp in the closed position. The inclined walls 49 serve to help draw the clamp down tight against the box in the event that it is not entirely closed before the tabs are bent.

It will be clear that the tabs 45 can readily be returned to their position in the same plane by the use of a pair of pliers in the event it is desired to withdraw the box for any changes in wiring.

Having thus described the invention, what is claimed as new and desired to be secured by Letters Patent is:

1. The herein described combination of an outlet box having an opening for the reception of a cable, said opening extending through both the back and an end wall of the box, a cable clamp assembly hinged to said box and including parts entirely outside thereof to engage and hold the sheath of a cable, while the conductors thereof pass through said opening, said clamp including means to close all of said opening except that through which the conductors pass when in one position.

2. The herein described combination of an outlet box having a knock-out opening extending into two walls from a rear edge thereof, a clamp assembly outside of the box, hinged to one of said walls and having means to close said opening when in one of the hinged positions, clamping means on said assembly positioned outside of the box to hold a cable in alignment with the opening in one wall when the assembly is in position to close the said opening and to hold it in alignment with the connected opening in the other wall when the assembly is in another position.

3. The combination with an outlet box having a knock-out extending continuously from an end wall into the rear wall, of an outside cable clamp adapted to hold a cable independently of any box wall and normally positioned to hold a cable to have its conductors pass through the part of the knock-out opening in the end wall, and means mounting said clamp for temporarily positioning entirely behind said rear wall with the conductors passing through the part of the knock-out opening in the rear wall.

4. The combination with an outlet box having a knock-out extending continuously from an end wall into the rear wall, of an outside cable clamp normally positioned to hold a cable to have its conductors pass through the part of the knock-out opening in the end wall, means mounting said clamp for temporary positioning entirely behind said rear wall with the conductors passing through the other part of the knock-out opening, and means on said clamp to close all of said knock-out opening but that through which the conductors pass when the clamp is in the first mentioned position.

5. The combination with an outlet box having a knock-out opening in a wall thereof, an outside cable clamp having relatively movable clamping parts, means articulating the whole of said clamp to said box whereby it may be positioned adjacent said wall to hold a cable in alignment with said opening, said means being so arranged that the clamp may be temporarily positioned adjacent an intersecting wall and within the confines of its projected area while holding a cable.

6. The combination with an outlet box having a knock-out opening in an end wall and extending into the rear wall, a cable clamp structure entirely outside of the box and including a hinge part adapted to overlie a portion of the rear wall of the box, a second part thereof adapted to cover the said opening in the adjacent end wall and having an aperture for cable conductors only, a third part having a cable channel in alignment with said aperture, a clamping plate for cooperation with said third part and secured thereto by an adjusting screw, and means articulating said hinge part to the rear wall for temporarily positioning the whole clamp assembly within the projected area of the said rear wall to permit the box and a connected cable to be inserted through a wall opening of substantially the same size as the box.

7. The combination of claim 6, in which the clamp assembly is constructed to accommodate two cables side by side.

8. The combination with an outlet box having a knock-out opening in an end wall thereof, a cable clamp assembly including a tightening means outside of said box and wholly movable in respect thereto, means to align said assembly to hold a cable in position to enter said opening, and means available from the inside of the box to lock the assembly in aligned position.

9. A switch or outlet box for flexible cable having knock-out openings in the walls thereof, complete cable clamps normally lying outside of said walls and each equipped to hold cables in alignment with said openings, and means mounting said entire clamps for swinging to positions entirely behind the box while cables are clamped therein.

10. A switch or outlet box for flexible cable having knock-out openings in the walls thereof, cable clamps normally lying outside of said walls and each equipped to hold cables in alignment with said openings, and means mounting said entire clamps for swinging to positions entirely behind the box, said openings in said walls extending into the back of the box to permit entrance of the cables into the box without substantial bending while the clamps are behind the same.

11. An outlet box having integral rear and end walls, removable side walls therefor, means to multiple said boxes upon removal of intermediate side walls, cable clamp assemblies entirely outside of and adapted for cooperation with said end walls, and means articulating each assembly to the corresponding rear wall.

12. An outlet box and hinged cable clamp combination in which the whole clamp assembly is mounted on a plate means hinging the plate to the box for movement to a position to overlie the outside of a wall thereof, a tongue punched out of said plate and extending substantially in a plane at right angles to the plate, a slot in said wall to receive said tongue with a portion inside of the box, a portion of the tongue being weakened where it passes through said slot whereby the portion inside the box may be readily distorted out of its original plane to prevent removal from the slot.

13. An outlet box having a rear wall and removable side walls, spaced slots cut into each of two opposite edges of said rear wall to define aligned oppositely directed tongues, a cable clamp carrying-plate adapted to overlie the portion of said rear wall between said tongues, and perforated ears bent up from said plate and so spaced as to engage over said tongues to hinge the plate to the rear wall.

14. An outlet box having a pair of spaced knock-out openings in an end wall thereof, continuations of said openings extending into the rear wall, a cable clamp having cable channels and conductor openings spaced the same as said knock-out openings and entirely outside of the same, and means hinging said clamp to said box, said means being so arranged that the clamp may assume positions with the said channels in alignment with the knock-out opening of either of the box walls.

15. An outlet box having a pair of spaced knock-out openings in an end wall thereof, continuations of said openings extending into the rear wall, a cable clamp having cable channels and conductor openings spaced the same as said knock-out openings and entirely outside of the same, means hinging said clamp to said box, said means being so arranged that the clamp may assume positions with the said channels in alignment with the knock-out opening of either of the box walls, and interlocking means on the box and clamp for fastening the latter for alignment with the end wall knock-out openings.

VICTOR R. DESPARD.